United States Patent [19]
Garofalo, Jr.

[11] 3,913,071
[45] Oct. 14, 1975

[54] DATA TERMINAL HAVING INTERACTION WITH CENTRAL SYSTEM

[75] Inventor: Frank John Garofalo, Jr., Woodstock, N.Y.

[73] Assignee: International Business Machines Corporation, Armonk, N.Y.

[22] Filed: July 16, 1973

[21] Appl. No.: 379,690

[52] U.S. Cl. ............................ 340/172.5; 179/2 DP
[51] Int. Cl. ............................................ G06f 3/08
[58] Field of Search ............ 340/172.5, 149 A, 152; 179/2 DP, 2 CA

[56] References Cited

UNITED STATES PATENTS

| | | | |
|---|---|---|---|
| 3,374,464 | 3/1968 | Brothman et al. | 340/172.5 |
| 3,395,392 | 7/1968 | Kulikauskas | 340/172.5 |
| 3,440,619 | 4/1969 | Lehman et al. | 340/172.5 |
| 3,718,764 | 2/1973 | Deschenes et al. | 179/2 DP |
| 3,740,725 | 6/1973 | Chapman et al. | 340/172.5 |

*Primary Examiner*—Gareth D. Shaw
*Assistant Examiner*—John P. Vandenburg

[57] ABSTRACT

A data entry system suitable for entry/exit (attendance) recording includes a terminal unit having identity card reading means, adapted to be connected via an extension line to a central apparatus such as a computer controlled telephone line switching system having data handling capabilities. The terminal unit includes a buffer to store the data read from the identity card prior to requesting service from the line switching system and includes a locally generated signal to indicate that the card was correctly read and means responsive to a signal from the central system to indicate that the data was accepted. The card forms a component of the system and is encoded in such fashion that the manner of its use indicates whether entry or exit information is being recorded, and the terminal unit is responsive to the information entered by the card and the response of the central system to provide appropriate logical output at the terminal, such as the activation of an automatic door lock.

10 Claims, 4 Drawing Figures

DATA TERMINAL HAVING INTERACTION WITH CENTRAL SYSTEM

CROSS REFERENCE TO RELATED APPLICATION

Application Ser. No. 379,691 by Frank J. Garofalo, Jr., and George N. Pardonner, Jr., entitled DATA INPUT APPARATUS, filed on even date herewith, is a related application.

FIELD OF THE INVENTION

This invention relates to data entry apparatus, and more particularly to a card reading terminal for use in a system including a central data handling apparatus, wherein the terminal has data analyzing, buffering and response capabilities.

BACKGROUND OF THE INVENTION

In the prior art of attendance recorders, time clocks have been employed wherein the user removes a card from a rack, inserts it into the time clock for imprinting, and then returns it to the rack. The user has immediate visual, and usually aural, confirmation that the clock has performed its complete function, i.e., that it has recorded the information on the card. There is no response from, or other interaction with, a central system. Other entrance recording systems utilize centrally wired badge-reader locks which lack local buffering and therefore require immediate central system availability.

The prior art also includes data gathering systems wherein there is a central system connected by wire to remote terminals. Such remote terminals may include card reading apparatus, for example, for reading a job ticket, and keyboard apparatus for entering information coordinate with the information read by the terminal from the card. Ordinarily, devices of this kind are not intended for rapid use by one person after another, as is the case of an attendance recorder, and may lack features which adapt them to efficient use with a communication line switching system.

SUMMARY OF THE INVENTION

According to one aspect of the invention, a system is provided comprising a terminal having means to read an identity card, such as a hand-held magnetic stripe card, and improved means responsive to a "good" read to activate a local signal indicating to the user that the terminal has accepted the data and that the central system has been signalled to that effect. It is a feature that the aforesaid local signal may be maintained until the central system accepts the data and causes the generation of a second signal indicative of that fact at the terminal, or until a time out circuit clears the terminal, upon the failure of the central system to accept the data within a specified time.

According to another aspect of the invention the terminal stays "off-hook", that is, it delays release of central equipment assigned to its extension line, for a period of time after completion of each transaction, so that the system is conditioned for repetitive servicing of a series of transactions, without delay such as may be encountered in an initial request for service.

In accordance with a preferred embodiment of the invention, the terminal buffer control means is responsive to the presence of a pre-existing "off-hook" condition to transmit data to the central system without waiting for any go-ahead signal from the central system, thereby simplifying repetitive transactions and increasing the through-put rate of the overall system.

Accordingly, it is an object of the invention to provide an improved terminal device for entry of data into a central system.

It is another object of the invention to provide a terminal device as aforesaid having means giving prompt and easily read indication that the data has been read and accepted.

It is another object of the invention to provide an improved terminal as aforesaid including means automatically maintaining the system in ready condition for a series of data entry and response transactions.

Still another object of the invention is to provide an improved terminal apparatus as aforesaid including means to provide local buffering of data when the central system is not ready to service the terminal, but immediate transmission of a completed and checked data message when the central system is ready to accept the data.

The foregoing and other objects, features and advantages of the present invention will be apparent from the following description of a preferred embodiment of the invention as illustrated in the accompanying drawings.

DETAILED DESCRIPTION

Figure 1:
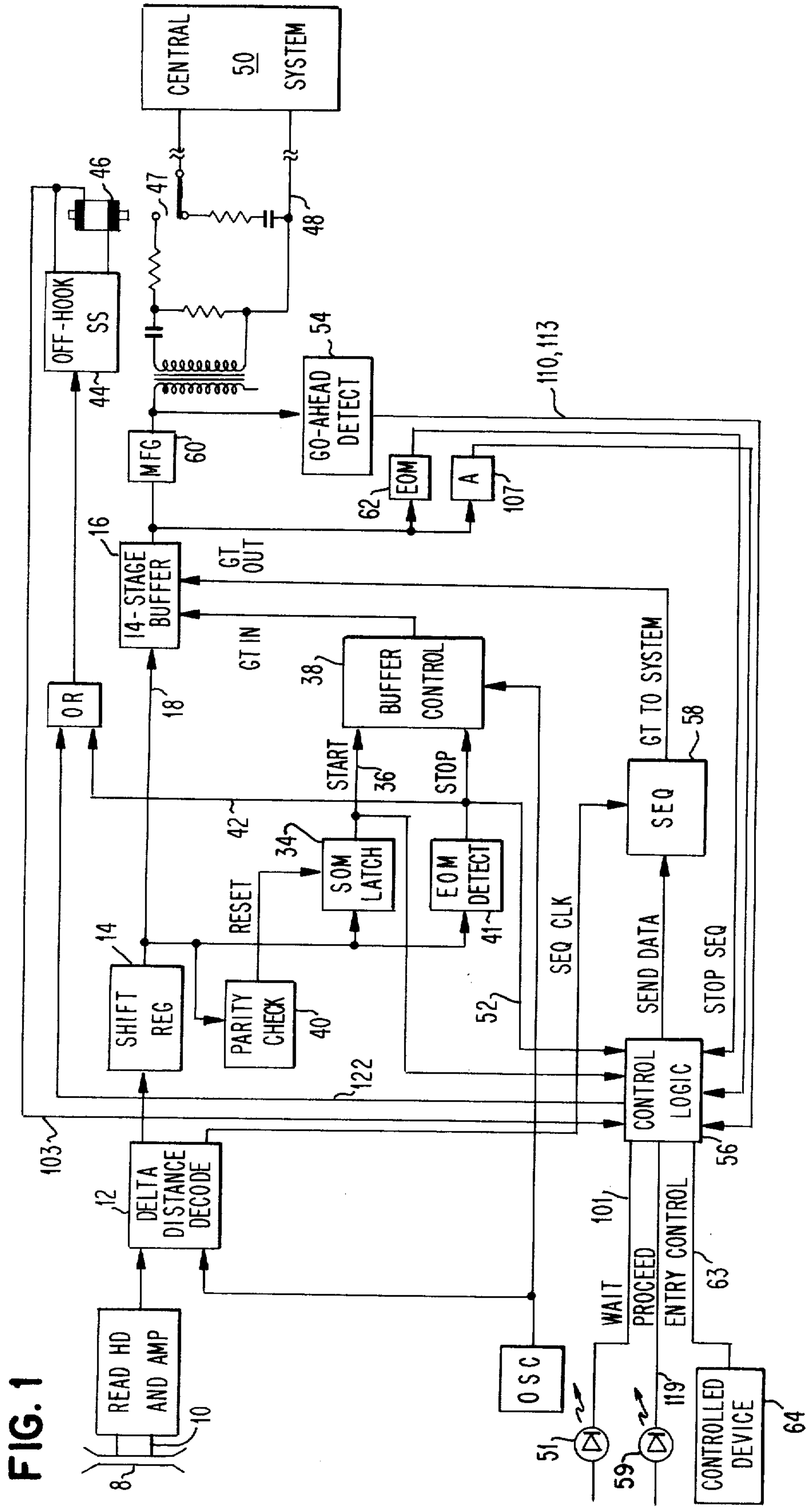
FIG. 1 is a schematic diagram of a terminal in accordance with the invention, employed in a system with which it is cooperative.
Figure 2:
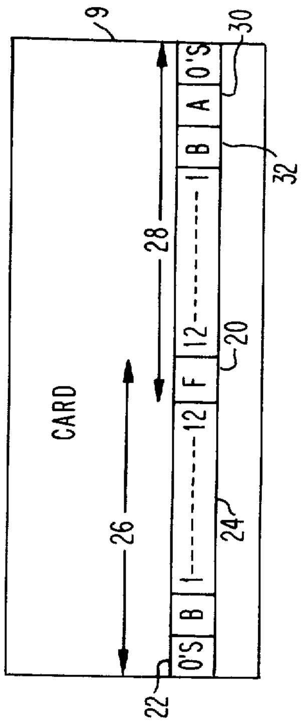
FIG. 2 is a representation of a magnetic stripe identity card suitable for use with the system of FIG. 1, showing diagramatically an encoding system on the card cooperative with aspects of the system of FIG. 1.

In the apparatus of FIG. 1, a slot 8 is provided through which a card 9 such as shown in FIG. 2 may be trained, the card being hand-held with the magnetic stripe thereof sliding along slot 8 past a read head 10. The information read serially by head 10 is decoded at 12. Where, as in the preferred embodiment, the card is hand-held as is trained through slot 8, it is preferred that a coding scheme such as delta modulation which is independent of the speed of travel of the card be employed. In delta modulation, the binary significance of the bits (that is, whether they are one or zero) is determined by the length of a given bit compared to its predecessor. With a bit density of, for example, seventy-five bits per inch along the magnetic stripe, the speed of travel of even a hand-held card will not vary greatly between adjacent bit positions, and therefore, delta modulation provides a reliable coding scheme for use in an apparatus of the instant kind. On the other hand, it may be desirable that the system respond to identity cards coded in other schemes, such as, for example, the ABA code which utilizes F2F, NRZI code. In such case decoder 12 can be adapted to respond to an F2F code as if it were a delta modulation code, making appropriate truth table conversion. The form of the code and the details of the decoder 12 do not per se form any part of the present invention, and any suitable coding and decoding scheme can be utilized.

The usual magnetic stripe card is recorded serial by bit and therefore shift register 14 is provided to convert the data read into serial by character, parallel by bit form.

The data is conveyed as it is read, decoded and deserialized in real time to buffer 16 via connection 18. In the message format shown in FIG. 2, a message to be transmitted may consist of up to 14 characters, including data and control characters. The start-of-message character is used for control only and is not transmitted to the central system. Accordingly, buffer 16 consists preferrably of a 14 stage register array, and is capable of storing the complete message and those control characters which are to be transmitted to the central system.

Referring now more particularly to FIG. 2, the magnetic stripe 20 of a card 9 suitable for use in accordance with the preferred embodiment of the system may be encoded with a set of leading zero's 22 followed by the hexidecimal character "B" and then by up to 12 data characters 24 followed by the hexidecimal character "F". The character B functions as a start-of-message character (SOM) and the character F functions as an end-of-message character (EOM). Accordingly, when the card is read from the left hand edge as seen in FIG. 2 only the left hand half of the magnetic stripe recorded information is of significance.

The right hand half of the magnetic stripe is recorded in a manner which is a mirror image of that which has been recorded on the left hand half except for inclusion of a hexidecimal "A" following the SOM character. In recording the magnetic stripe a character in the left hand half 26 is recorded in conventional hexidecimal code but those in the right hand half 28 of the stripe are recorded in the mirror image of the hexidecimal code. Accordingly, when read backwards, that is, from the right hand edge toward the center, a conventional hexidecimal output is obtained. Since, with a parity bit added, the "hex" code for F is 11111, this character is read the same whether forward or backward and, therefore, the same character functions as an EOM for each half of the magnetic stripe. In the drawing, the B, 30 in the right hand half is shown as an A and a A, 32 is shown as a B to indicate the mirror image recording. That is, a hex B, with parity 01011, is the mirror image of a hex A, with parity 11010, and vice versa. Thus, when character 30 is read from right to left, that is backwards, it will be read as 01011, not 11010, and will be recognized as an SOM B, and character 32 will be read 11010, not 01011, and will be recognized as an A.

Returning to FIG. 1, the detection of SOM at 34 with good parity activates the start input 36 of buffer control 38 to initiate storage of characters as they are supplied from deserializer 14 to buffer 16 via 18. Buffer control 38 stores incoming characters to the last unoccupied register of buffer 16. If any character has incorrect parity, SOM 34 is reset by parity check unit 40 thereby terminating the data inputting operation. Otherwise, the characters are stored in order in buffer 16 until an EOM is detected by circuit 41 which stops the storage operation and, via line 42, starts off-hook signal shot (mono-stable multivibrator 44). This causes the terminal to "go off-hook", that is, to signal the central system that service is desired. This signal is propagated to the extension by a relay 46 activated by the off hook single shot 44 and having a normally open contact 47 in series with the extension loop 48 connecting the terminal to the central system 50. At this point, the terminal unit has accepted the data in its buffer 16 and "wait" light 51 is turned on in response to the EOM signal on line 52.

The central system responds with a go-ahead tone, analagous to a dial tone, which is detected by circuit 54. Any suitable detector can be employed; a band-pass filter followed by a rectifier is one simple example. Circuit 54 in turn activates control logic 56 to initiate sequencer 58 to gate data from buffer 16 to multifrequency generator 60 for transmission, in MF coded form, via the extension to the central system 50. The central system may be, for example, an IBM 3750 line switching system, generally of the kind described in IBM Journal of Research and Development, Volume 13, No. 4, pages 408–455. The system 50 and its appropriate programming do not form, per se, any part of the present invention.

Nevertheless, the terminal of the present invention is designed to cooperate with such a system in the same sense that it yields appropriate off-hook signals and MFG inputs to the system, and it responds to dial tone-like responses from the system and interprets such responses as go-ahead and data accepted signals. This is a so-called "hot line " or non-dialed connection type of operation wherein the system 50 recognizes that the mere going off-hook of extension 48 means that that extension requires service of the kind to which it is dedicated, in this case, attendance recorder service.

Data is stepped from buffer 16 under the control of sequencer 58 until the end of message character is detected by EOM decoder 62 at the output of buffer 16. The output of EOM decoder 62 activates control logic 56 to stop, via sequencer 58, readout operation of buffer 16.

The use made by the central system 50 of the MF encoded information received by the system over the extension line 48 may vary according to the application. In a typical case the data sent to the system may include an identification number of the card user, and, as aforesaid, it may include an A character to indicate that an "entry" as opposed to "exit" report is being made. The system may then consult its files to determine whether the identity number is a valid one and may log the event for future reference. Typically, whether the reporting was of an entry or exit operation, the system responds with a simple short dial tone indicating that the data has been received and has been processed satisfactorily. This second dial tone is detected as before by go-ahead detector 54 and operates control logic 56 to drop the wait signal 51 and raise the proceed signal 59 for the duration of the go-ahead signal detected at 54. Where the message had included an A this fact will have been detected at 107 to set an appropriate latch in control logic 56. The fact that this latch is set, combined with the second go-ahead detect signal, raises a signal on line 63 for example for operation of an automatic door lock 64.

In the illustrated embodiment, off-hook single shot 44 remains set for approximately 3.5 seconds. This is typically more than sufficient for one complete transaction as thus far described. Preferably the second signal from go-ahead detector 54 is employed to retrigger off-hook single shot 44 for an additional 3.5 seconds so that the extension line will be held briefly in condition to immediately service a subsequent transaction should one be initiated. This is frequently the case in an attendance recorder application where a series of users will be entering data in rapid succession. If such a subsequent data entry operation occurs within the time-out period of single shot 44, the EOM entered at the beginning of that transaction will provide another such signal to single shot 44 but there will be no need to wait for another go-ahead detect signal from detector 54 before transmitting the data to the central system since the extension remains active and the central system equipment (multifrequency receiver, etc.) servicing the same remains available.

Error conditions are detected both in the remote recorder unit and in the central system. For example, if a correct start of message sequence is not present, the SOM detector circuit 34 will not be activated. If a parity error occurs on any character, the latch in SOM circuit 34 will be reset to terminate the operation of the recorder. If the central system is not able to service the extension, single shot 44 will time out and reset the control logic 56, terminating the recorder operation. If no end-of-message character is received, the EOM detect circuit will not trigger the Control Logic to start the Sequencer (SEQ). Finally, if the central system refuses to accept the data (for example, if it finds upon checking the files that the identification number of the card read is not currently valid) no go-ahead signal will be received back from the central system and the off-hook single shot 44 will time out thereby resetting the terminal.

Figure 3:
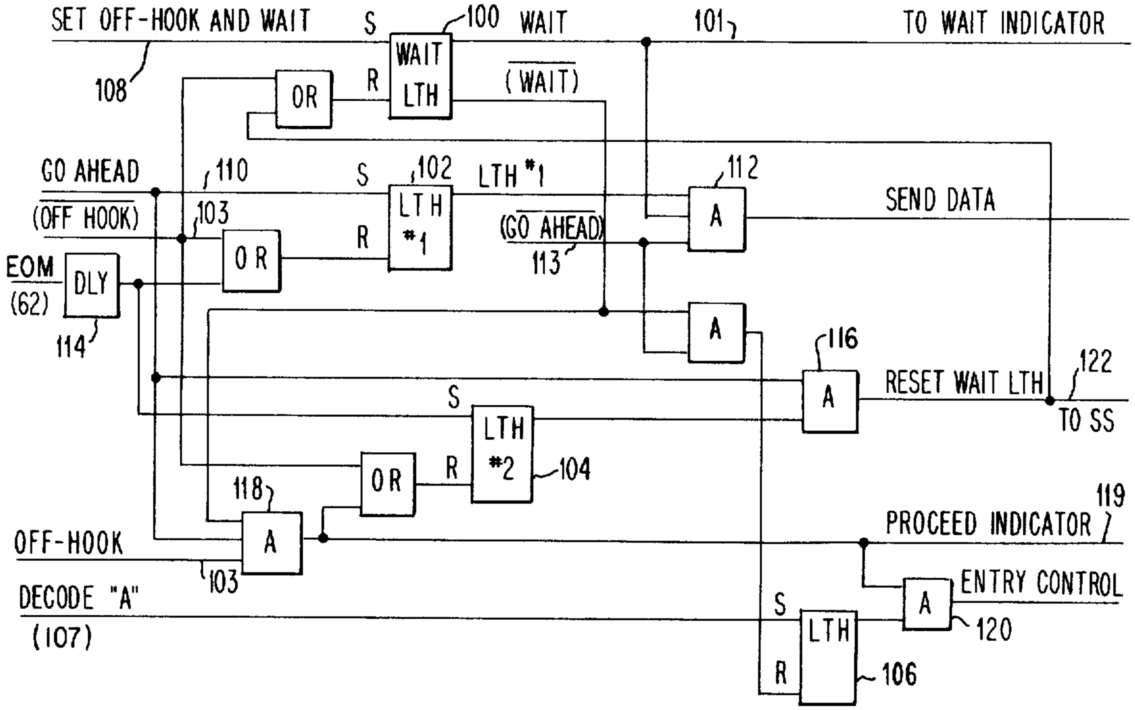
FIG. 3 is a logic diagram showing a portion of the control employed in the terminal of FIG. 1.

FIG. 3 shows a logic scheme suitable for implementation of control logic 56. In this implementation, latches 100, 102, 104 and 106 control a logical sequence of events to provide the operation aforedescribed. Latch 100 records a wait condition and provides an output 101 to the wait indicator 51. It is set by a signal on line 108 which is responsive to a signal on 52 from the EOM of FIG. 1. Wait latch also conditions AND circuit 112, indicating that good data has been read. Latch 102 records the fact that a go-ahead signal 110 has been received from go-ahead detector 54. There are two primary reasons for recording this event. One is that the send data command is responsive to the fall of the go-ahead signal. Thus, as shown in FIG. 3, AND circuit 112 provides, if it has been conditioned by wait latch 100, an output upon the occurence of a not-go-ahead 113 (absence of go-ahead) output from go-ahead detector 54 following a go-ahead signal on that line, in other words, at the fall of go-ahead signal. Latch 102 is reset upon the occurence of a not-off-hook signal on line 103 or, after a delay 114 of an EOM signal from detector 62, to terminate the send data signal. The delayed EOM signal from 114 also sets another control latch 104, the output of which is ANDed at 116 with the next go-ahead signal from 54 to reset wait latch 100. Thus the wait signal indicator is held in ON condition even after the message has been fully sent, until the go-ahead signal from detector 54 indicates that the control system 50 has accepted the message, or until single shot 44 times out. The resetting of wait latch 100 in conjuction with a go-ahead signal and an off-hook signal activates AND circuit 118 to bring up the proceed indicator line 119 and at the same time reset latch 104 and satisfy one leg of AND circuit 120. The other leg of AND circuit 120 is energized from the set output of latch 106. This latch records the presence of a hexidecimal A in the data transmitted to the central system, this fact having been detected at 107, FIG. 1, at the output of the buffer 16 as the message was transmitted. When the AND circuit 120 is satisfied, the entry control line 63 is activated.

If there is a subsequent transaction before off-hook single shot 44 times out, latch 102 will be in set condition because, even though it was reset by a delayed EOM signal from the output of the buffer, it had been set again by the accept signal (second go-ahead) from detector 54. Accordingly, when signal is obtained from wait latch 100 which is set by operation of the EOM detector 41 at the output of shift register 14 upon the receipt of the second message, data can be sent immediately without a new go-ahead signal, latch 102 having already been set by the previous accept signal (i.e., the last go-ahead signal from detector 54).

Figure 4:
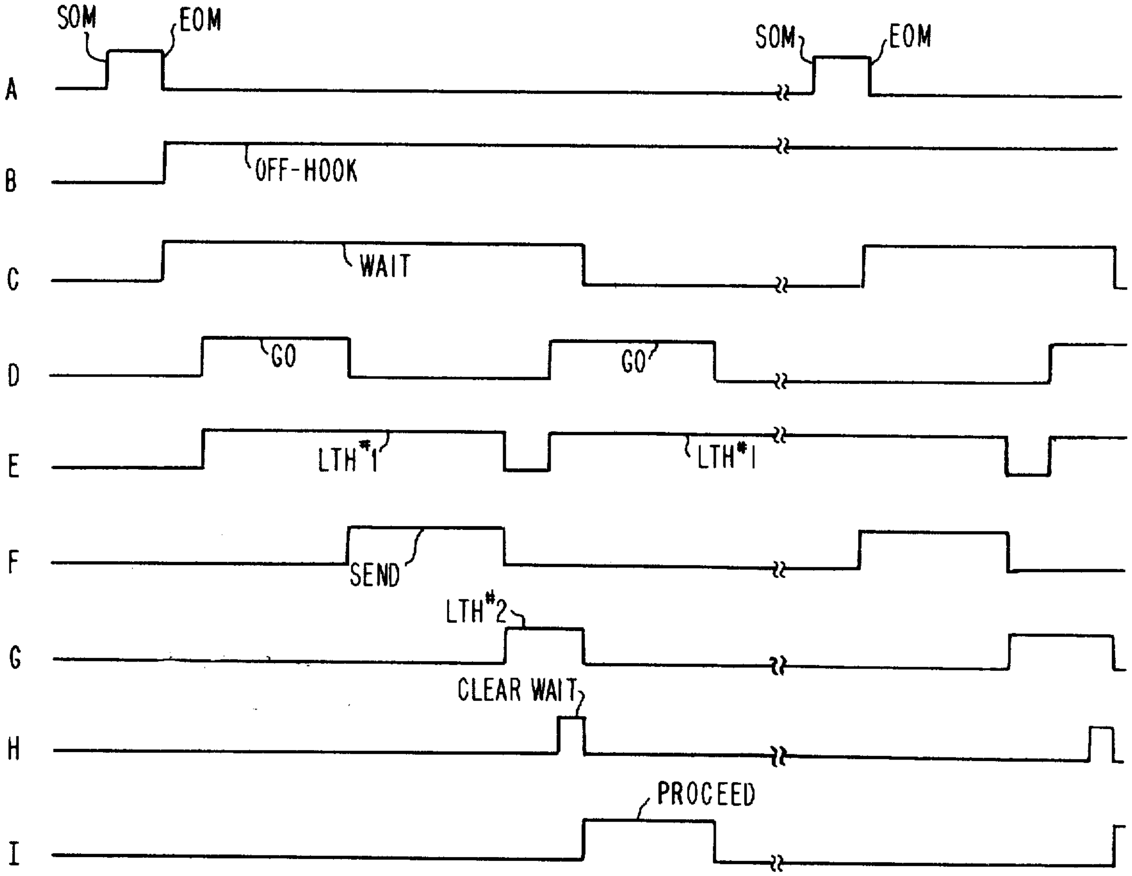
FIG. 4 is a timing diagram showing the relationship of various signals in the operation of the apparatus of FIGS. 1 and 3.

FIG. 4 summarizes the system operation. At the end of a good read, that is, at the occurence of an EOM at the output of shift register 14, as shown in line A of the diagram, off-hook single shot is set, line B, and wait latch is set, line C. When the central system has responded to the off-hook signal (the closure of the extension line by relay 46 the central system provides a go-ahead signal, line D, which sets latch No. 1, line E. Send data line F is activated by the fall of go-ahead line D, and at the termination of sending data (as indicated by an EOM character being transmitted), latch N0. 1 is reset (line E) and latch No. 2 is set (line G). The system, upon accepting the data, will respond with another go-ahead signal (line D) which turns on latch No. 1 (line E) and provides a clear wait signal (line H) which resets the wait latch (line C). Finally, Proceed signal on 119 (line I) is activated by AND 118.

As shown in FIG. 3, a go-ahead signal from detector 54 occuring when Latch No. 2 is already set by a signal from the buffer output EOM detector 62 (FIG. 1), is effective via AND circuit 116 and line 122 to retrigger single shot 22. Therefore, off-hook single shot 22 and its associated circuits will not return to reset condition until time-out of the single shot, which has been extended in this manner. Accordingly, second and succeeding transactions initiated before the extended time-out of the single shot can proceed immediately and do not await a "go-ahead" signal from the central system. This is seen in FIG. 4, wherein the second EOM of line A is followed immediately by a SEND data signal, which initiates gating the data from the buffer 16 to the central system 50 as before. Thus, the terminal is particularly adapted to use as an entrance/exit reporting device operating in a communications line switching environment.

While the invention has been particularly shown and described with reference to a preferred embodiment thereof, it will be understood by those skilled in the art that various changes in form and detail may be made therein without departing from the spirit and scope of the invention.

What is claimed is:

1. In the data entry system, a central system and a terminal comprising means adapted to accept entry of data for transmission to said central system, the improvement wherein said terminal comprises:

first indicator means comprising latch means and means responsive to the accepting means in the terminal to set said latch means by and upon the acceptance of data by said accepting means, said indicator means comprising first sensible means connected to said latch means to be operated upon and for the duration of the set condition of said latch means to indicate to a user of the terminal that the data has been accepted by the terminal, means in the terminal operative to activate a connection of the terminal to said central system for said transmission thereto and to receive a data response signal from the central system, and second indicator means in the terminal responsive to said connection and active by and upon receipt of said data response signal from said central system to reset said latch means, said second indicator means comprising a second sensible means operative to provide an indicator signal distinguishable from that of said first sensible means and operable by and upon said receipt of said response signal by the central system.

2. Apparatus in accordance with claim 1 wherein said sensible indicator means comprise separate indicator light means.

3. Apparatus in accordance with claim 2 wherein said terminal includes a time-out means, and means responsive to said accepting means to initiate said time-out means, and means operative to reset said latch means upon the occurrence of either time-out of said time-out means or said receipt of said response from the central system.

4. Apparatus in accordance with claim 3, wherein said second indicator means includes driver means for said second sensible means responsive to and maintained in active state during said response signal from the connected central system indicating a predetermined response to said data.

5. Apparatus in accordance with claim 4, wherein said time-out means includes means coupled to said connection and operative to reinitiate the time-out period of said time-out means by and upon the occurrence of each said data response signal from the connected central system.

6. In a data entry system, a data entry terminal, a central data handling system, and a data transmission channel interconnecting said terminal with said central system, said channel comprising a normally inactive extension connected to said terminal, first means in said terminal responsive to data entry employment thereof to switch said extension to active state, said first means including a time-out means operative to maintain said active state for a predetermined time, and second means in said terminal responsive to a data response signal from the central system via said channel to reinitiate said time-out means.

7. A system in accordance with claim 6, wherein said data entry terminal is an entry/exit reporter terminal adapted for employment by multiple users in succession, said second means including logical decoder means adapted to interpret said signal as a central system data response signal.

8. A system in accordance with claim 7, wherein said central system comprises a line switching system and activation of said extension constitutes an off-hook signal thereto, requesting service, said terminal further including buffer means adapted to store data entered into said terminal, and sequencer means responsive to said logical decoder means to gate said data from said buffer to said channel, said logical decoder being responsive to said time-out means to interpret each second and successive signal received from said central system during the active state of said time-out means as a data response signal.

9. A data entry terminal for use in a data entry system comprising at least one terminal for receiving data and a central controller for controlling said terminal, said terminal comprising:

an information input for receiving and buffering data from a terminal user;

an input indicator connected to said information input and having an active state to indicate to said user that said data has been received and buffered;

said information input including settable means operative to maintain said operative state of said input indicator;

connecting means connected to said information input and to an operating means to connect said terminal to said central controller for transmitting said data to said central controller and transmitting a response from said central controller to said operating means; and an operation indicator connected to said operating means to indicate to said user that said controller has responded to said input data, said settable means being connected to said operating means to thereupon be reset to terminate said operative state of said input indicator.

10. A terminal in accordance with claim 9, wherein said terminal includes time-out means responsive to said data input to maintain the connection of said terminal to said controller for a predetermined time, and means responsive to said controller to reinitiate said time-out means for a new predetermined period.

* * * * *